US008607512B2

(12) United States Patent
Batut et al.

(10) Patent No.: US 8,607,512 B2
(45) Date of Patent: Dec. 17, 2013

(54) PARKING SHELTER PROVIDED WITH PHOTOVOLTAIC SOLAR PANELS

(75) Inventors: Bernard Batut, Montauban (FR); Philippe Pascal, Paris (FR); Marc Vogeleisen, Paris (FR); Shahin Gashti, Paris (FR)

(73) Assignees: Art' ur SARL, Paris (FR); Enerqos France, Paris (FR); Bernard Batut, Montauban (FR)

( * ) Notice: Subject to any disclaimer, the term of this patent is extended or adjusted under 35 U.S.C. 154(b) by 0 days.

(21) Appl. No.: 13/322,212

(22) PCT Filed: May 25, 2010

(86) PCT No.: PCT/EP2010/057185
§ 371 (c)(1),
(2), (4) Date: Feb. 8, 2012

(87) PCT Pub. No.: WO2010/136468
PCT Pub. Date: Dec. 2, 2010

(65) Prior Publication Data
US 2012/0131866 A1 May 31, 2012

(30) Foreign Application Priority Data
May 26, 2009 (FR) ...................... 09 53466

(51) Int. Cl.
*E04D 13/18* (2006.01)
(52) U.S. Cl.
USPC ............................ 52/173.3; 136/244; 126/621
(58) Field of Classification Search
USPC ........ 52/173.3, 167.7, 167.8, 64, 66, 68, 6, 7, 52/8, 9, 10; 136/244, 251, 291; 126/623, 126/621, 622; 257/433; 248/121, 122.1
See application file for complete search history.

(56) References Cited

U.S. PATENT DOCUMENTS

| 3,277,616 | A | * | 10/1966 | Koss | 52/31 |
| 5,152,109 | A | * | 10/1992 | Boers | 52/143 |
| 5,279,085 | A | * | 1/1994 | DiPaolo et al. | 52/169.2 |
| 5,315,227 | A | * | 5/1994 | Pierson et al. | 320/101 |
| 6,590,363 | B2 | * | 7/2003 | Teramoto | 320/101 |
| 8,008,806 | B2 | * | 8/2011 | Day | 307/64 |
| 8,013,569 | B2 | * | 9/2011 | Hartman | 320/109 |

(Continued)

FOREIGN PATENT DOCUMENTS

| EP | 1626140 | 2/2006 |
| EP | 1933389 | 6/2008 |
| FR | 2169482 | 9/1973 |
| WO | WO 97/25496 | 7/1997 |

OTHER PUBLICATIONS

International Search Report for International Application No. PCT/EP2010/057185 mailed Sep. 2, 2010.

*Primary Examiner* — William Gilbert
*Assistant Examiner* — Gisele Ford
(74) *Attorney, Agent, or Firm* — Pearl Cohen Zedek Latzer Baratz, LLP

(57) ABSTRACT

The invention relates to a parking shelter (200) in particular comprising a roof (205) at least partially covered with photovoltaic solar panels (206), characterized in that said parking shelter comprises four supporting legs (201; 202; 203; 204), wherein at least one first supporting leg (201) and one second supporting leg (202) have a substantially vertical bottom portion (301) and an inclined top portion (302) directed towards the periphery of the roof.

9 Claims, 2 Drawing Sheets

(56) References Cited

U.S. PATENT DOCUMENTS

| | | | |
|---|---|---|---|
| 8,143,841 B2* | 3/2012 | Gochenaur | 320/101 |
| 8,176,686 B2* | 5/2012 | Santini | 52/7 |
| 2009/0126281 A1* | 5/2009 | Santini | 52/7 |
| 2009/0223142 A1* | 9/2009 | Shingleton et al. | 52/71 |
| 2010/0275975 A1* | 11/2010 | Monschke et al. | 136/251 |
| 2011/0030285 A1* | 2/2011 | Kaufman | 52/82 |
| 2011/0113705 A1* | 5/2011 | Raczkowski | 52/173.3 |

* cited by examiner

PARKING SHELTER PROVIDED WITH PHOTOVOLTAIC SOLAR PANELS

CROSS-REFERENCE TO RELATED APPLICATIONS

This application is a National Phase Application of PCT International Application No. PCT/EP2010/057185, International Filing Date May 25, 2010, claiming priority of French Patent Application 0953466, filed May 26, 2009, the contents of which are incorporated herein by reference.

The present invention relates to a parking shelter equipped with photovoltaic solar panels. Its aim essentially is to equip sheltered parking areas permitting solar energy to be recovered, and advantageously exploited, by proposing a modular solution that is easy to install and economical in terms of production cost.

The field of the invention, in general terms, is that of the recovery and utilisation of solar energy, and more particularly that of parking shelters equipped with photovoltaic solar panels. In the current trend for diversification of available energy sources, the exploitation of solar energy is an interesting alternative which is fully in the process of development. Numerous incentive policies encourage companies and individuals to equip their buildings with photovoltaic solar panels.

Open-air parking areas are particularly interesting locations for installing photovoltaic solar panels. The advantages of such installations are in fact multiple, mainly in regions of high insolation; in particular, proposing shelters for vehicles in open-air parking areas provides comfort for users, who expose their vehicles less to heat and bad weather; next, installing photovoltaic solar panels on roofs of parking shelters is not particularly complex, since these roofs are not located very high up, and do not present particular constraints, especially of an aesthetic nature, as encountered for residential buildings. Finally, advantageously, the solar energy recovered and converted into electrical energy can be directly exploited by the users of these parking areas, who can for example electrically recharge their vehicle if it is of the electric type.

The development of such shelters for parking areas has thus been observed in recent times, an example being represented diagrammatically in FIG. 1. In this example, a shelter 100 is essentially constituted by a roof 101 having an overall rectangular shape supported by four feet 102; roof 101 is covered by a plurality of photovoltaic solar panels 103, which are fitted together mechanically and connected electrically to one another according to known principles. In the known examples, feet 102 must be positioned in foundations, not represented in the figure, previously provided in the ground in order to ensure the support of shelter 100, especially in the case where wind is present. In order to limit the wind load, preference has moreover been given to roofs 101 disposed essentially horizontally. Taking account of the wind load is in fact a primary factor in the design of parking shelters, since the latter are usually located on vast flat areas particularly exposed to the wind.

Such designs of parking shelters present a certain number of drawbacks which make their installation and their use unsatisfactory.

Thus, on the one hand, the horizontal character of the roofs does not provide an optimum yield of the solar energy recovered by the photovoltaic solar panels. Such solar panels in fact recover a maximum amount of energy when they are substantially inclined in a previously known direction, depending on the geographical location of the shelters in question. On the other hand, the fact of having to install foundations in the ground to ensure satisfactory wind resistance makes the deployment of such shelters restrictive and costly.

In this context, the invention aims to propose a parking shelter permitting the aforementioned problems to be overcome, said parking shelter advantageously comprising am inclined roof, a supporting base which permits the presence of foundations to be dispensed with and, in all cases, a special supporting structure that improves the wind resistance, primarily in shelters for open-air parking areas.

The subject-matter of the invention thus relates essentially to a parking shelter comprising in particular a roof covered at least partially by photovoltaic solar panels, characterised in that said parking shelter comprises four supporting feet, with at least a first supporting foot and a second supporting foot comprising a substantially vertical bottom portion and an inclined top portion directed towards the periphery of the roof.

Apart from the main features which have just been mentioned in the preceding paragraph, the parking shelter according to the invention can have one or a plurality of the undermentioned additional features, considered individually or according to all the technically possible combinations:

- the roof has an inclination, in particular an inclination between 10 and 20 degrees with respect to the horizontal;
- the third foot and the fourth foot each have a substantially vertical bottom portion and an inclined top portion directed towards the periphery of the roof;
- the parking shelter according to the invention comprises a first base and a second base, each base providing for the fixing of two of the four feet; the base is a weighted base, i.e. it provides for the fixing of the feet by having in particular a sufficient weight, without requiring the previous provision of foundations to support said base in the ground;
- at least one of the two bases comprises a first barrier and a second barrier spaced apart by a central space, each barrier receiving and supporting the substantially vertical portion of one of the feet of the shelter;
- at least one of the bases comprises a battery capable of storing solar energy recovered by the photovoltaic solar panels, and means of restoring the stored electrical energy;
- the first supporting foot and the second supporting foot are articulated by an articulation disposed at a junction between the bottom portion and the top portion of the first supporting foot and of the second supporting foot;
- the parking shelter comprises at least one reinforcement rod disposed beneath the roof and connecting the upper ends of two of the supporting feet, in particular the ends of the supporting feet not fixed on one and the same base;
- the junction between the reinforcement rod and the upper ends of the supporting feet is provided by a swivel joint;
- at least one of the supporting feet is hollow to allow an electric cable to pass through.

Other features and advantages of the invention will clearly emerge from the description given below, by way of indication and under those circumstances limiting, of embodiments making reference to the figures appended hereto, in which:

FIG. 1, already described, represents an example of a parking shelter of the prior art equipped with photovoltaic solar panels;

For reasons of clarity, the elements appearing in the various figures have been designated by the same reference numbers. Similarly, only the elements of assistance in understanding the invention have been represented.

Figure 1:
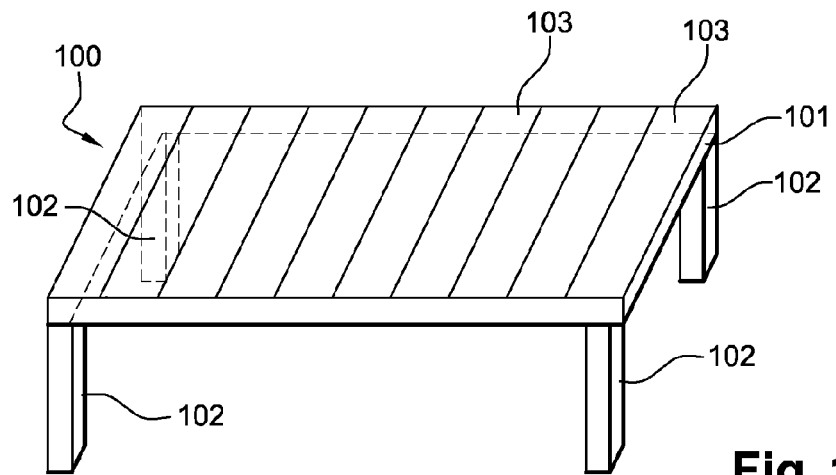
Figure 2:
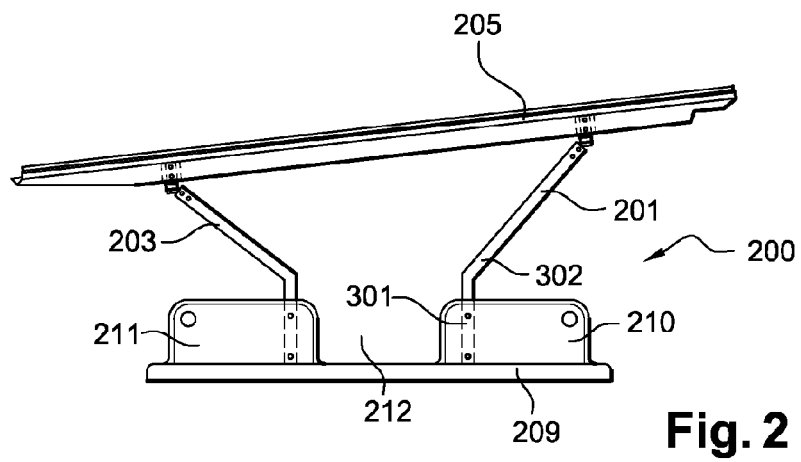
FIG. 2 represents a side view of a first example of embodiment of the parking shelter according to the invention.

In FIG. 2, a first example of embodiment of a parking shelter 200 according to the invention has been represented in a diagrammatic side view.

Figure 3:
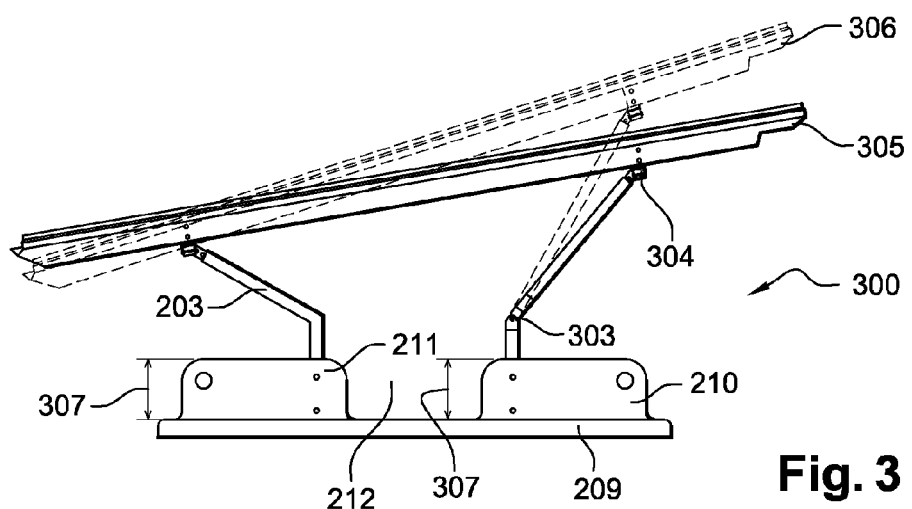
FIG. 3 represents a side view of a second example of embodiment of the parking shelter according to the invention.
Figure 4:
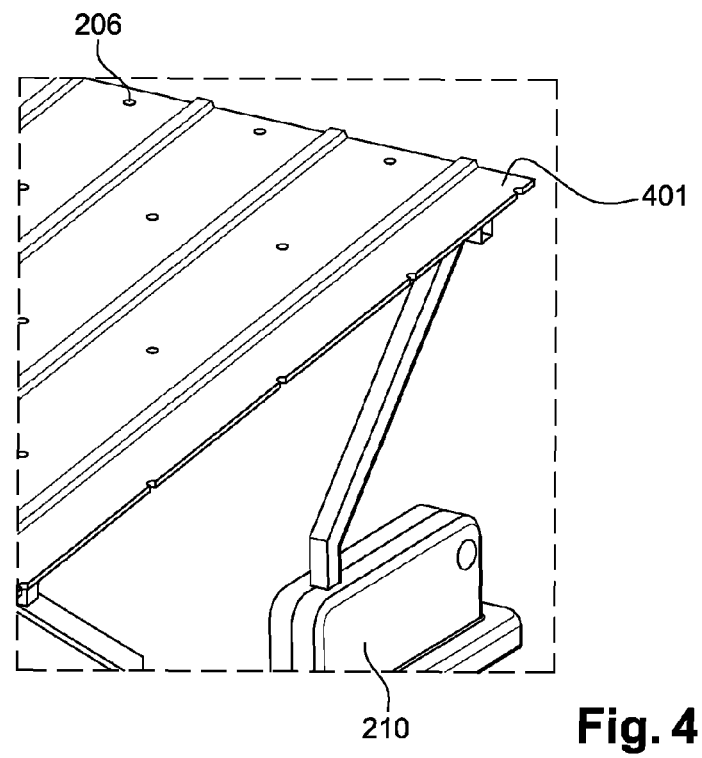
FIG. 4 represents a detail of the first example of the parking shelter according to the invention.
Figure 5:
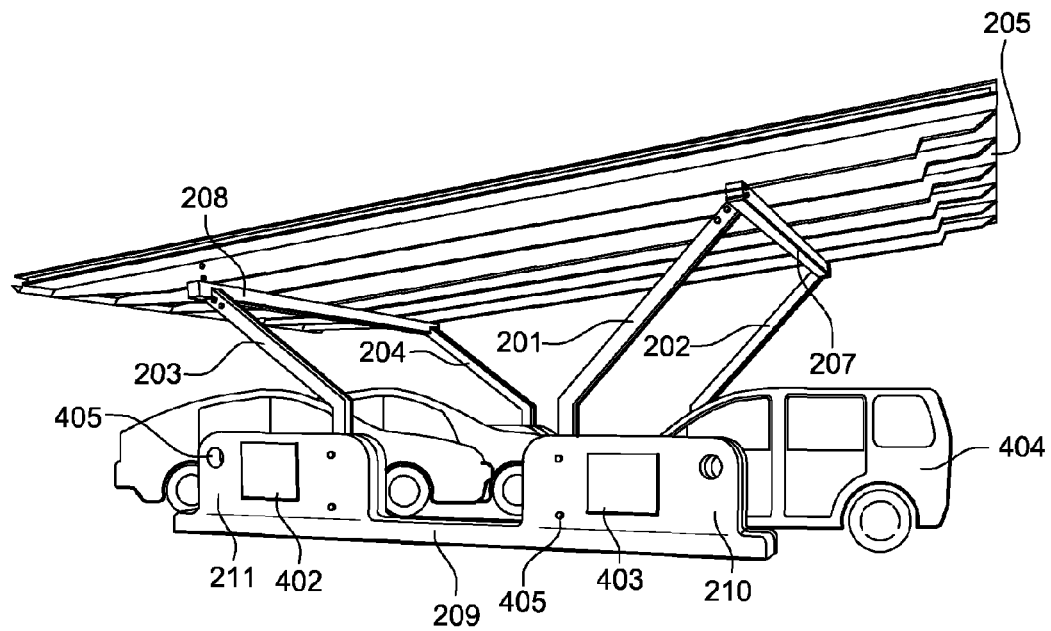
FIG. 5 shows a perspective view of the first example of embodiment of the parking shelter according to the invention.

Shelter 200 is essentially constituted, in this example:

by a roof 205, produced for example from juxtaposed wooden panels, essentially rectangular in shape, the upper part whereof is covered by photovoltaic solar panels 206, visible in FIG. 3, which are juxtaposed and connected to one another in a known manner so as to permit the recovery of solar energy and the conversion of said solar energy into electrical energy;

a structure permitting the support of said roof 205, said structure being constituted here:

by a set of four supporting feet, all visible in FIG. 5, with a first foot 201, a second foot 202, a third foot 203 and fourth foot 204; to advantage, the supporting feet are made of galvanised steel in order to ensure the rigidity of the supporting structure. In some examples of embodiment, they can be hollow so as to permit the passage of electric cables intended to convey the electrical energy arising from the conversion of the solar energy by the photovoltaic solar panels towards the ground;

a first reinforcement rod 207 and a second reinforcement rod 208, respectively connecting the upper ends of first supporting foot 201 and second supporting front 202, and the upper ends of third supporting foot 203 and fourth supporting foot 204. Reinforcement rods 207 and 208 are disposed beneath roof 205; the latter can rest on reinforcement rods 207 and 208. Reinforcement rods 207 and 208 are also used to avoid any lateral deflection of the supporting feet which they connect.

a first base 209 and a second base not visible in the figures. The bases are advantageously produced in heavy materials, typically concrete. Their presence thus makes it possible to dispense with the previous provision of foundations, which makes the installation of the parking shelters according to the invention particularly straightforward. In the first example represented in FIGS. 1, 3, 4 and 5, but also in the example represented in FIG. 2, which will be described below, the two bases each comprise a first barrier 210 and a second barrier 211. First barrier 210 and second barrier 211 are separated by a central space 212 of length sufficient to allow a user to pass between the first barrier and the second barrier.

In the invention, in order to improve the wind resistance of parking shelter 200, first supporting foot 201 and second supporting foot 202 are provided with a special form, these feet being the largest when roof 205 is in an inclined position, as is the case in the examples represented. The special form consists in a foot, a bottom portion 301 whereof is substantially vertical, and a top portion 302 whereof, present in the extension of bottom portion 301, is inclined. The inclination of the top portion with respect to the horizontal is typically between 50 degrees and 120 degrees. The inclination is directed towards the periphery of roof 205: this means that top portion 302, which starts from the upper end of bottom portion 301, itself disposed in a substantially central position of the base supporting it, extends obliquely towards one end of roof 205. In the examples represented, top portion 302 extends along a vertical plane and parallel to the length of the rectangle defining the shape of roof 205.

In some embodiments, only the first and second supporting feet have a non-linear shape, the two other feet being able to be simple vertical feet. However, in the advantageous embodiments, in order to increase further the resistance to wind load, the third and fourth supporting feet also have an overall non-vertical shape, identical to that of the first and third supporting feet.

In the first example of embodiment, the supporting feet are not articulated.

FIG. 3 illustrates a second example 300 of embodiment of the parking shelter according to the invention, wherein first supporting foot 201 and second supporting foot 202 are articulated. The articulations of these supporting feet are advantageously provided at two points of the feet in question, but in other examples of embodiment, it can be limited to a single articulation. Thus, it is proposed in the example represented to dispose on each of the feet in question:

a first swivel joint 303 at the junction between the bottom portion and the top portion;

a second swivel joint 304 at the upper end of the top portion, at the point where the reinforcement rod joins said top portion.

With such an articulation system, the inclination of roof 205 can be controlled, in order to adapt to the height of the sun in summer and in winter, in such a way as to move between a first position 305 and a second position 306. The articulation system described can advantageously be supplemented by the possibility of adjusting the height of the supporting feet, by causing their bottom portion to move in vertical translation 307 in the barriers of the bases. The height of roof 205 is thus also adjustable; it can for example be relatively high in locations with little exposure to the wind, and lower in windy zones.

In an advantageous embodiment, provision is made to dispose in the barriers of the bases at least one energy storage element of battery type 402 permitting the storage of continuous current. The barriers can advantageously also contain an inverter 403 providing for the conversion of the continuous current into alternating current; the current produced by the photovoltaic solar panels can also either be injected and converted onto the national power grid, or conveyed to a distribution terminal located in the immediate vicinity of the parking shelter in question, said distribution terminal advantageously being able directly to incorporate payments means. Thus, an electric vehicle 404 parked under the parking shelter according to the invention can, during its parking time, recharge its batteries with electricity directly produced by the shelter in question.

To advantage, the parking shelters according to the invention are modular: it is easily possible to juxtapose them, the connection between the various modular blocks—each modular block being constituted by a parking shelter of the type of those described above—being provided at the roofs, and/or the bases. For this purpose, provision is made for example, at the bases, to join the bases by fixing means disposed in holes 405 previously made in the various barriers of the bases. At the roofs, provision is made for example such that one end 401 of the roof is not covered over its whole length by a photovoltaic solar panel; the part not covered 401 is thus intended to be covered by a portion of a photovoltaic solar panel of the adjacent modular block, each modular block providing moreover suitable electrical connection means in order that the photovoltaic solar panels of the two adjacent modular blocks can be connected electrically.

The invention claimed is:

1. A parking shelter comprising:
    a roof covered at least partially by photovoltaic solar panels;
    four supporting feet, with at least a first supporting foot and a second supporting foot comprising a substantially vertical bottom portion and an inclined top portion directed towards a periphery of the roof, and a third foot and a forth supporting foot each comprising a substantially vertical bottom portion and an inclined top portion directed towards the periphery of the roof; and
    a first base and a second base, each base providing for the fixing of two of the four feet, at least one of the two bases comprising a first barrier and a second barrier spaced apart by a central space, each of first and second barriers receiving and supporting the substantially vertical portion of one of the feet of the shelter.

2. The parking shelter according to claim 1, wherein the roof has an inclination.

3. The parking shelter according to claim 1, wherein at least one of the bases comprises a battery capable of storing solar energy recovered by the photovoltaic solar panels and means of restoring the stored electrical energy.

4. The parking shelter according to claim 1, wherein the first supporting foot and the second supporting foot are articulated by an articulation disposed at a junction between the bottom portion and the top portion of the first supporting foot and of the second supporting foot.

5. The parking shelter according to claim 1, further comprising at least one reinforcement rod disposed beneath the roof and connecting upper ends of two of the supporting feet.

6. The parking shelter according to claim 5, wherein a junction between the at least one reinforcement rod and the upper ends of the supporting feet is provided by a swivel joint.

7. The parking shelter according to claim 1, wherein at least one of the supporting feet is hollow to allow an electric cable to pass through.

8. The parking shelter according to claim 2, wherein the inclination is between 10 and 20 degrees with respect to the horizontal.

9. The parking shelter according to claim 5, wherein the two supporting feet whose upper ends are connected by the at least one reinforcement rod are the supporting feet not fixed on one and the same base.

* * * * *